(12) United States Patent
Shintani

(10) Patent No.: US 8,576,334 B2
(45) Date of Patent: Nov. 5, 2013

(54) CAMERA BODY COMPONENT ARRANGEMENT

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 33 days.

(21) Appl. No.: 13/337,297

(22) Filed: Dec. 27, 2011

(65) Prior Publication Data

US 2012/0182469 A1    Jul. 19, 2012

(30) Foreign Application Priority Data

Jan. 18, 2011  (JP) .................. 2011-007442
Dec. 12, 2011  (JP) .................. 2011-271048

(51) Int. Cl.
*H04N 5/225*  (2006.01)
*G03B 17/00*  (2006.01)

(52) U.S. Cl.
USPC ................. 348/374; 348/360; 396/533

(58) Field of Classification Search
USPC .............. 348/360, 374; 396/529, 533
See application file for complete search history.

(56) References Cited

U.S. PATENT DOCUMENTS

| 7,182,529 | B2* | 2/2007 | Kurosawa ............. 396/358 |
| 7,532,247 | B2* | 5/2009 | Kamoda et al. ........ 348/373 |
| 7,742,101 | B2* | 6/2010 | Nomura et al. ........ 348/374 |
| 7,933,515 | B2* | 4/2011 | Iyoda et al. .......... 396/535 |
| 8,169,540 | B2* | 5/2012 | Shintani ............. 348/374 |
| 8,368,806 | B2* | 2/2013 | Shintani ............. 348/374 |
| 2011/0164171 | A1 | 7/2011 | Yasuda et al. |
| 2011/0194023 | A1* | 8/2011 | Tam et al. ............ 348/374 |

FOREIGN PATENT DOCUMENTS

WO    WO-2010/029731 A1    3/2010

* cited by examiner

*Primary Examiner* — Ngoc-Yen Vu
(74) *Attorney, Agent, or Firm* — Shinjyu Global IP

(57) ABSTRACT

A camera body is provided that includes a base member, a body mount, a focal plane shutter and a fastening member. The body mount is configured to support an interchangeable lens. The fastening member is configured to fasten the focal plane shutter unit to the base member. The body mount, the base member, and the focal plane shutter unit are disposed between a subject side of the camera body and a user side of the camera body in that order. The focal plane shutter unit is fastened to the base member that faces toward the user side of the camera body.

5 Claims, 7 Drawing Sheets

CAMERA BODY COMPONENT ARRANGEMENT

CROSS-REFERENCE TO RELATED APPLICATIONS

This application claims priority under 35 U.S.C. §119 to Japanese Patent Application No. 2011-007442, filed on Jan. 18, 2011, and Japanese Patent Application No. 2011-271048, filed on Dec. 12, 2011. The entire disclosure of Japanese Patent Application No. 2011-007442 and Japanese Patent Application No. 2011-271048 are hereby incorporated herein by reference.

BACKGROUND

1. Technical Field

The technology disclosed herein relates to a camera system, such as a digital still camera that mainly captures still pictures, or a video camera that mainly captures moving pictures. More specifically, the technology disclosed herein relates to a digital camera with interchangeable lenses in which a lens unit can be attached and removed.

2. Background Information

International Laid-Open Patent Application 2010/029731 discloses a camera with interchangeable lenses in which a lens unit can be attached and removed. This camera has a live-view function. This camera also has a normally-on type of focal plane shutter in order to enable the live-view function. This camera employs a configuration that does not have a mirror box apparatus, and is provided with a chassis to which are attached the focal plane shutter and imaging means for producing image signals.

SUMMARY

Because a conventional digital camera with interchangeable lenses is equipped with a mirror box apparatus, it was difficult to reduce the size of the camera body. In view of this, the inventors of the present application considered a new digital camera with interchangeable lenses that had no mirror box apparatus. Therefore, since there was no mirror box apparatus, there was no need for a focal point plate, a pentaprism, or another such optical viewfinder function as with a conventional camera with interchangeable lenses, and it was decided that the viewfinder function could be accomplished with a display device disposed on the camera rear face, or an electric viewfinder.

Meanwhile, with a conventional camera with interchangeable lenses, a mount spring and mount are attached to the mirror box from the subject side, a shutter unit and an optical unit including an imaging element are attached to the mirror box from the opposite side of the mount, and these are attached after adjusting to a specific flange back and inclination to the mount. However, in changing the mirror box to a chassis member and reducing the size, the chassis member inevitably ended up being larger in order to ensure enough space to attach the mount, the shutter unit, and the optical unit.

The technology disclosed herein was conceived in light of the above situation. Thus, one object of the technology disclosed herein is to provide a compact digital camera with interchangeable lenses.

In accordance with one aspect of the technology disclosed herein, a camera body is provided that includes a base member, a body mount, a focal plane shutter and a fastening member. The body mount is configured to support an interchangeable lens. The fastening member is configured to fasten the focal plane shutter unit to the base member. The body mount, the base member, and the focal plane shutter unit are disposed between a subject side of the camera body and a user side of the camera body in that order. The focal plane shutter unit is fastened to the base member that faces toward the user side of the camera body.

These and other features, aspects and advantages of the present invention will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Embodiments

1: Configuration 1-1: Overview of Imaging Device

Figure 1:
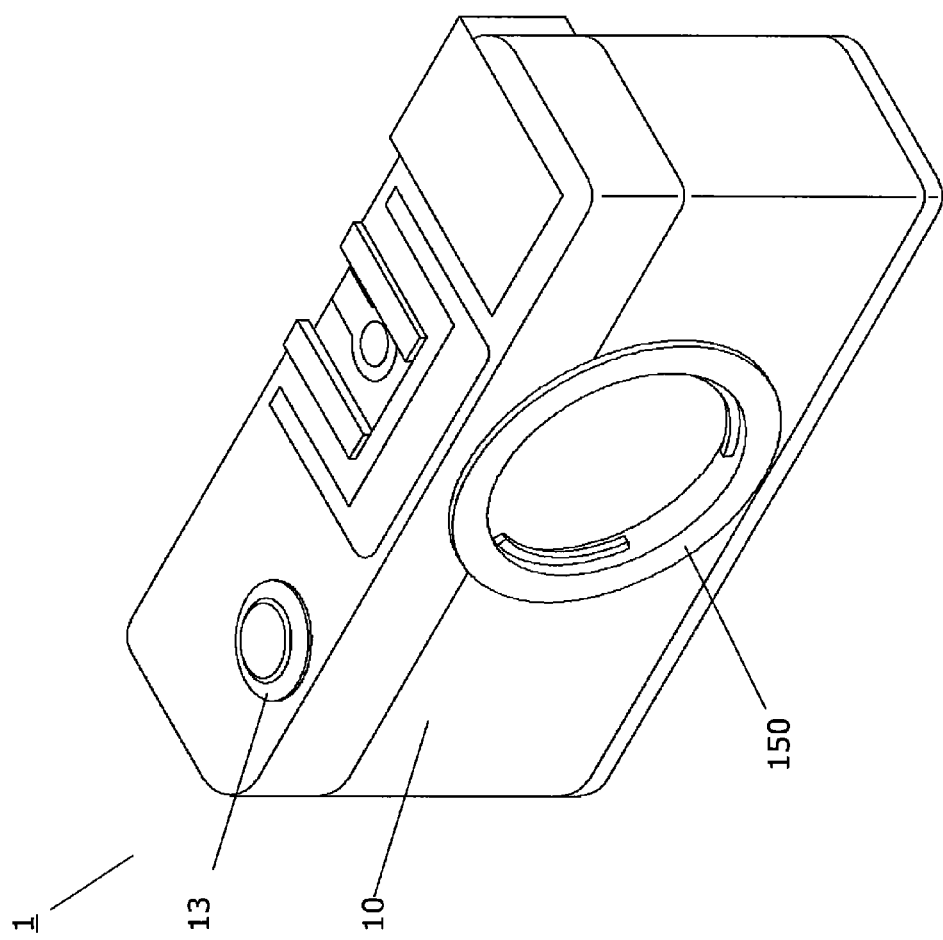
FIG. 1 is an oblique view of a camera body 1.

FIG. 1 is an oblique view of a camera body 1 pertaining to the embodiment. The camera body 1 is a camera body with interchangeable lenses, and comprises a housing 10, a shutter button 13, and a body mount 150 to which a lens unit (not shown; an example of an interchangeable lens) can be removably attached.

The various components will now be described in detail. For the purposes of this description, the subject side of the camera body 1 will be referred to as the "front," the imaging plane side as the "back" or "rear," the vertically upper side in the normal orientation of the camera body 1 as "upper," and the vertically lower side as "lower." The terms "left" and "right" refer to when the camera body 1 is viewed from the subject.

1-2: Configuration of Camera Body 1

Figure 2:
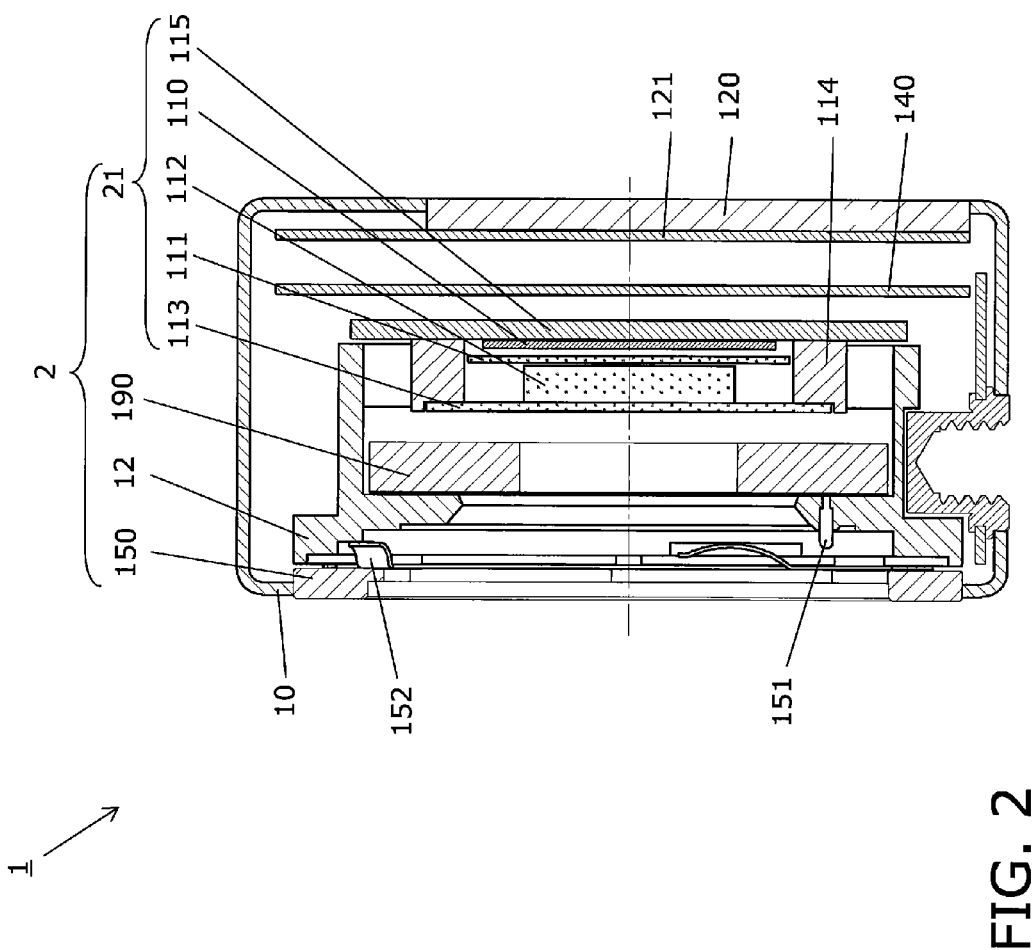
FIG. 2 is a central, vertical cross section of the camera body 1.

The configuration of the imaging device (camera) will be described through reference to FIG. 2. FIG. 2 is a central, vertical cross section of the camera body 1.

The main components of the camera body 1 are the body mount 150, a focal plane shutter unit (hereinafter abbreviated as "shutter unit") 190, a diaphragm 113, an optical low-pass filter 112, a cover glass 111, a CMOS image sensor 110, a heat diffusing plate 115, a main circuit board 140, a reinforcing plate 121, and a display device 120, which are disposed inside the housing 10 in that order starting from the front.

The camera body 1 does not have a mirror box apparatus. This means that the flange back is smaller than with a conventional single lens reflex camera. Reducing the flange back also allows the camera body 1 to be more compact. Furthermore, reducing the flange back allows for a more compact lens unit.

The CMOS image sensor 110 is one example of an imaging element that captures an optical image of a subject and converts it into an electrical image signal. The concept of "imaging element" encompasses a CCD image sensor, etc.

The main circuit board 140 includes a circuit board that controls the drive of the CMOS image sensor 110. The main circuit board 140 also includes a circuit board that performs specific processing on image data from the CMOS image sensor 110, and controls the drive of the CMOS image sensor 110. The main circuit board 140 is an example of an imaging element circuit board that performs specific processing, such as A/D conversion, on image data from the CMOS image sensor 110.

The display device 120 displays an image, etc., indicating the display-use image data. This display-use image data is image data that has undergone image processing by the main circuit board 140, data for displaying as images the imaging conditions, operation menus, and so forth of the camera body 1, and the like. The display device 120 is able to selectively display both moving and still pictures. The display device 120 has a liquid crystal display.

The display device 120 is provided to the camera body 1. In this embodiment, it is disposed on the rear face of the housing 10, but may be disposed anywhere on the camera body 1.

The display device 120 is also one example of a display component provided to the camera body 1. Examples of other display components that can be used include organic EL devices, inorganic EL devices, plasma display panels, and other such devices that can display images.

The body mount 150 holds a removal lens unit by bayonet coupling. The body mount 150 can be mechanically connected to the lens mount (not shown) of the lens unit via a mount spring 152, and can be electrically connected to the lens mount of the lens unit by an electrical contact 151. Data and/or control signals can be sent back and forth between the camera body 1 and the lens unit via the body mount 150 and the lens mount.

The shutter unit 190 is what is known as a focal plane shutter. The shutter unit 190 is disposed between the body mount 150 and the CMOS image sensor 110. The shutter unit 190 performs shutter drive as needed for exposure by a shutter drive mechanism 191 (discussed below; see FIG. 3).

The optical low-pass filter 112 eliminates the high-frequency component of subject light. More specifically, the optical low-pass filter 112 separates the subject image formed by the lens unit so that the resolution will be grainier than the pitch of the pixels in the CMOS image sensor 110. In general, a CMOS image sensor or other such imaging element has a YCM complementary color filter or an RGB color filter called a Bayer array for each pixel. Therefore, if there resolution drops to one pixel, not only will false color be generated, but if the subject is a repeating pattern a very bad moire pattern will occur, so it is preferable for the optical low-pass filter 112 to suppress the occurrence of false color and moire patterns. The optical low-pass filter 112 also has an Ir cut function for cutting out infrared light.

The diaphragm 113 is disposed further to the front than the CMOS image sensor 110, and prevents dust from clinging to the CMOS image sensor 110. The vibration also knocks off any dust clinging to the diaphragm 113 itself. More specifically, the diaphragm 113 is a transparent, thin, plate-like member, is affixed in the plane of the optical low-pass filter 112, and is fixed to an optical element holding member 114 via a piezoelectric element (not shown). The diaphragm 113 vibrates along with the vibration of the piezoelectric element produced by the application of AC voltage. An antifogging layer which is made from titanium oxide or another such transparent photocatalyst is formed on the front face of the diaphragm 113.

The element holding member 114 holds the optical members belonging to the CMOS image sensor 110, and serves to make them into a single unit. These optical members include the diaphragm 113, the optical low-pass filter 112, the cover glass 111, the CMOS image sensor 110, and the heat diffusing plate 115, in that order starting from the front. In this embodiment, the element holding member 114 and the optical members constitute a CMOS image sensor unit 21 (one example of an imaging element unit).

A chassis 12 (an example of a base member) supports the body mount 150, the shutter unit 190, and the CMOS image sensor unit 21. The body mount 150, the shutter unit 190, and the CMOS image sensor unit 21 are screwed to the chassis 12. In this embodiment, the chassis 12, the body mount 150, the shutter unit 190, and the CMOS image sensor unit 21 constitute a mount unit 2.

1-3: Features of Configuration

Figure 3:
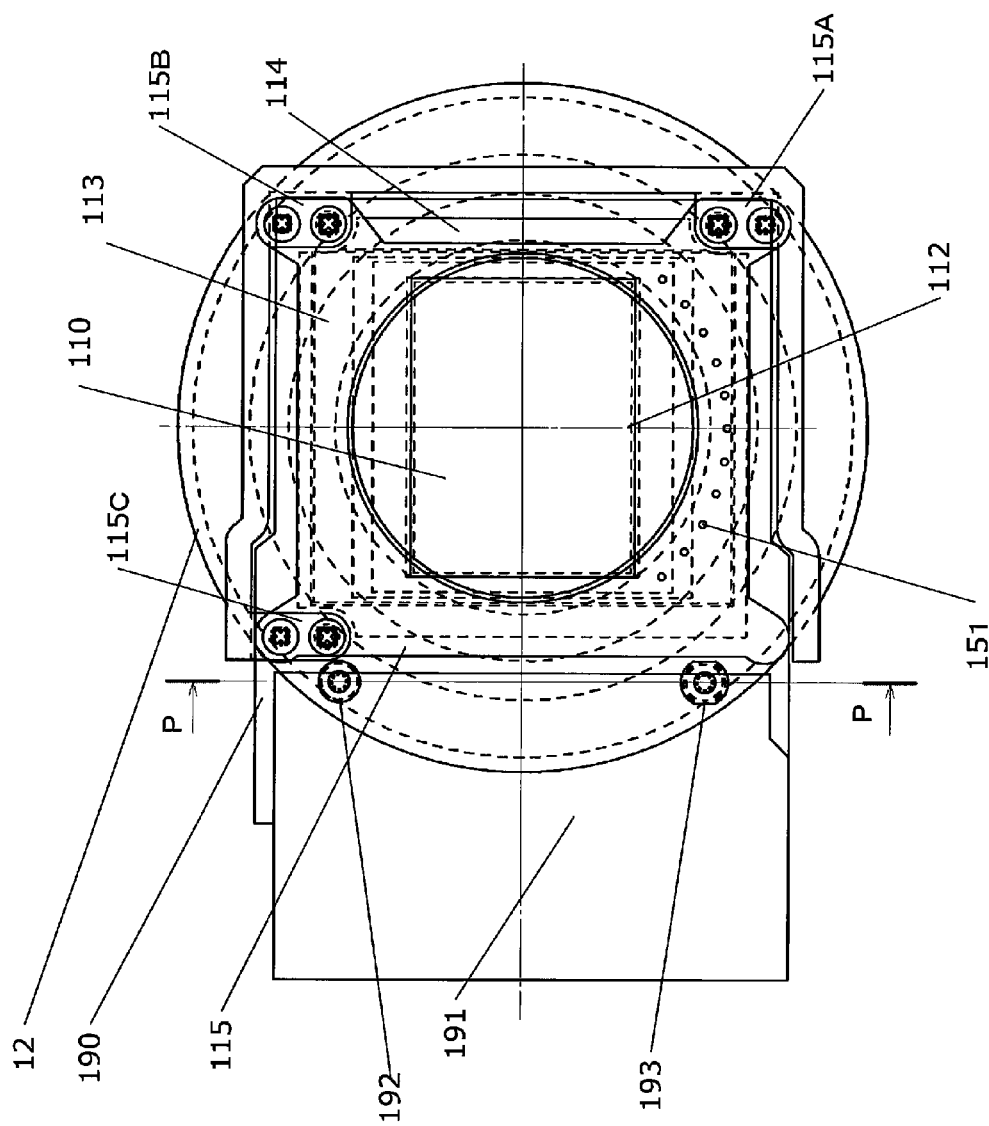
FIG. 3 is a rear see-through view of a mount unit.
Figure 4:
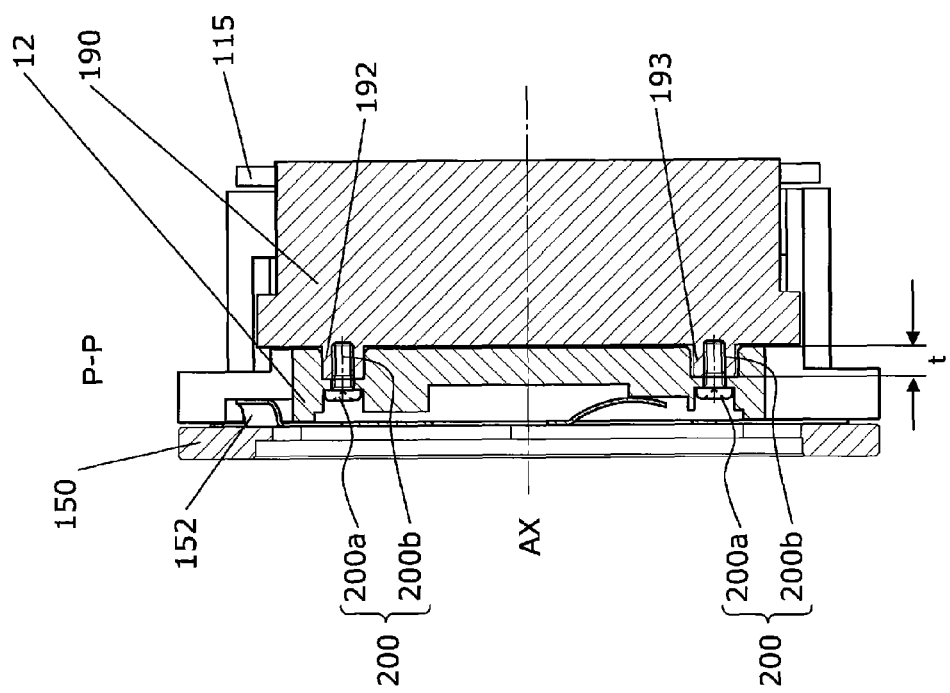
FIG. 4 is a cross section along the P-P line in FIG. 3.
Figure 5:
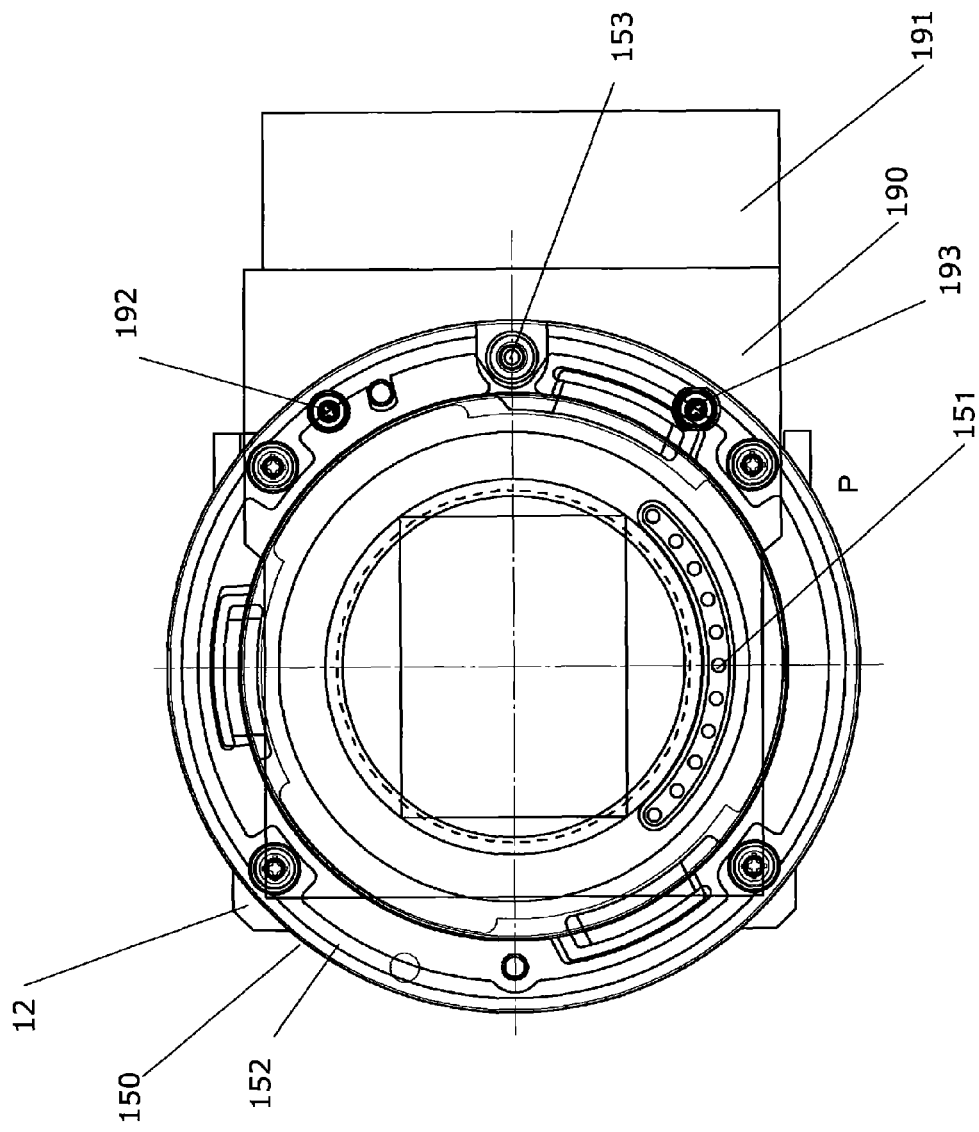
FIG. 5 is a front see-through view of the mount unit.

The features of the configuration will be described through reference to FIGS. 3, 4, and 5. FIG. 3 is a rear see-through view of the mount unit 2. FIG. 4 is a cross section along the P-P line in FIG. 3. FIG. 5 is a front see-through view of the mount unit 2.

Eliminating individual differences in flange back is a necessary condition for a camera system, and as discussed above, various components are interposed between the body mount 150 and the CMOS image sensor 110 in the imaging device. Accordingly, it becomes necessary to adjust the inclination of the CMOS image sensor 110, as well as the flange back.

With the embodiment, as shown in FIG. 3, what is known as a push-pull thread configuration is employed at three places, namely, screw fastened components 115A, 115B, and 115C (one example of a fastening part), of the chassis 12 and the heat diffusing plate 115 as a configuration for screwing the CMOS image sensor unit 21 to the chassis 12. The CMOS image sensor unit 21 is fastened to the chassis 12 from the user side at the screw fastened components 115A, 115B, and 115C so that the inclination and the distance from the body mount 150 can be adjusted. This makes it possible to adjust the inclination of the CMOS image sensor 110, as well as the flange back.

The method for attaching the shutter unit 190 will now be described.

As shown in FIG. 4, a positioning boss 192 and a directional reference boss 193 are formed on the front side of the shutter unit 190, and screw holes that are coaxial with these bosses are provided. The positioning boss 192 and the directional reference boss 193 each have a chassis 12 fitting allowance (that is, a protrusion height) t. The chassis 12 is provided with a recess and a long recess corresponding to the positioning boss 192 and the directional reference boss 193. As shown in FIG. 4, the positioning boss 192 fits into the recess and hits the bottom face of the recess, and the directional reference boss 193 fits into the long recess and hits the bottom face of the long recess, which positions the shutter unit 190 with respect to the chassis 12. As shown in FIG. 4, the shutter unit 190 is fixed to the chassis 12 by fastening with two screw members 200 (one example of fastening member) from the front of the chassis 12. The screw members 200 have a screw part 200a (an example of a threaded shaft portion) that links the shutter unit 190 to the chassis 12, and a screw head 200b that is formed at the distal end of the screw part 200a and is manipulated when the screw part 200a is inserted or removed. The screw head 200b is disposed more toward the subject than the screw part 200a in a state in which the shutter unit 190 has been linked to the chassis 12.

As shown in FIG. 5, the positioning boss 192 and the directional reference boss 193 are disposed on the rear face of the body mount 150 as seen from the front. Therefore, the thread fastening of the shutter unit 190 can be loosened by removing the body mount 150 that is rigidly fixed to the chassis 12. Consequently, there is no need to attach the shutter unit 190 from the rear side as in the past, and there is no need to make the screw fastened components larger in the planar direction and avoid the shutter drive mechanism 191 (an example of the "mechanism for driving the shutter vanes") and the drive range of the shutter vanes had by the focal plane shutter. As a result, the camera body 1 can be made more compact.

Next, the method for removing the shutter unit 190 will be described. FIGS. 6A to 6D are central, lateral cross sections of the mount unit 2.

Figure 6:
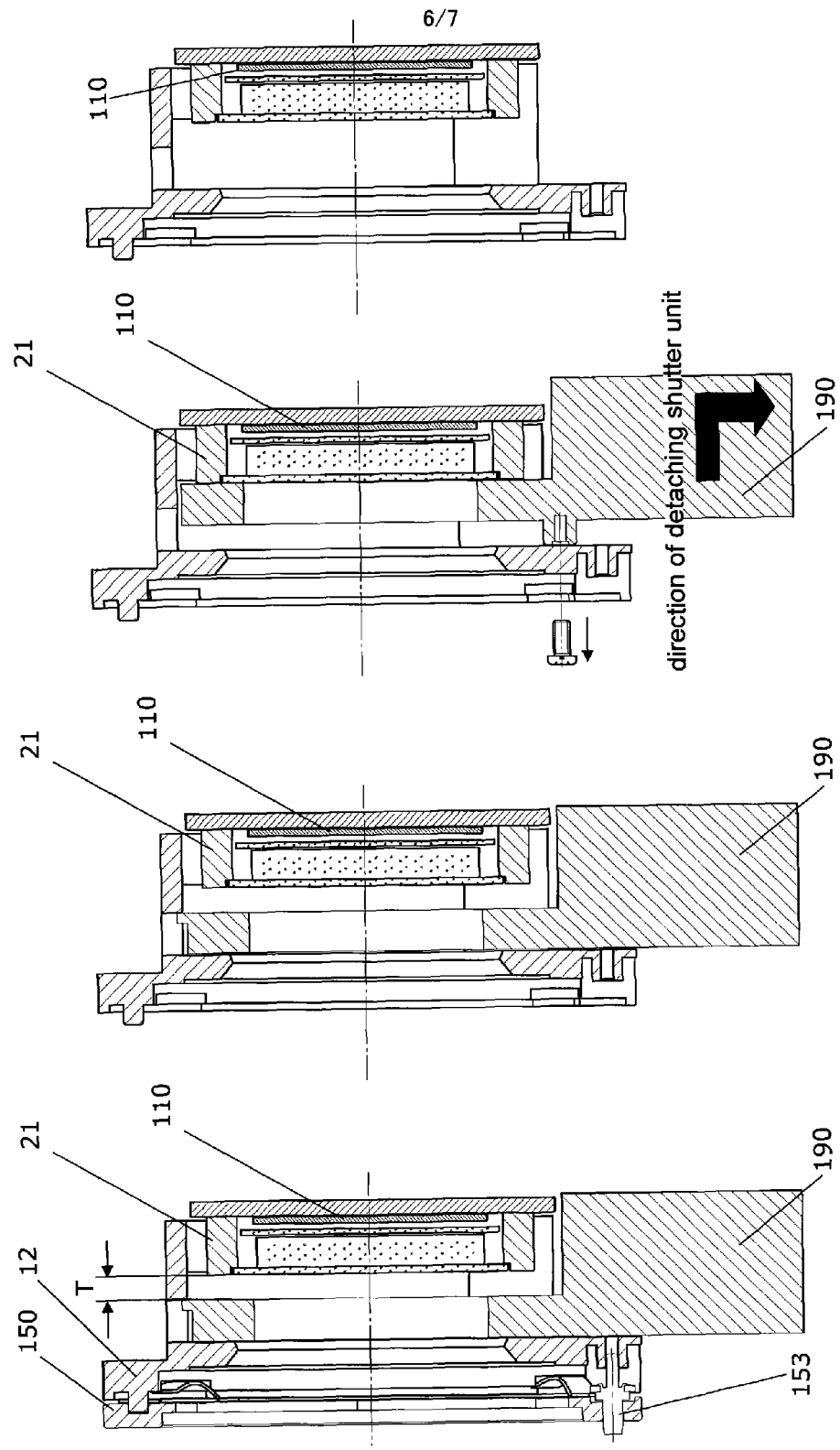
FIG. 6 is a central, lateral cross section of the mount unit.

As shown in FIG. 6A, a gap T is formed between the shutter unit 190 and the CMOS image sensor unit 21. The gap T is larger than the chassis 12 fitting allowance t (see FIG. 4) of the positioning boss 192 and the directional reference boss 193. That is, the relation T>t is valid between the gap T and the fitting allowance t.

Therefore, as shown in FIG. 6B, after the removal of the body mount 150 fixed to the chassis 12, the shutter unit 190 threads are loosened as shown in FIG. 6C and the shutter unit 190 is moved in the direction of the arrow in the drawing, and then, even if the shutter unit 190 is removed by pulling it out to the left as shown in FIG. 6D, this will have no effect on the adjust of inclination and flange back of the CMOS image sensor 110. Therefore, if repair and/or replacement of the shutter unit 190 should become necessary during the manufacturing process, there will be no need for readjustment of inclination and flange back of the CMOS image sensor 110, nor any need for adjustment equipment to be readied during repair.

Also, with the embodiment, as shown in FIG. 6C, the shutter unit 190 can be removed without affecting the adjustment of inclination or flange back of the CMOS image sensor 110, by loosening the threads of the shutter unit 190.

Conventional Example

Figure 7:
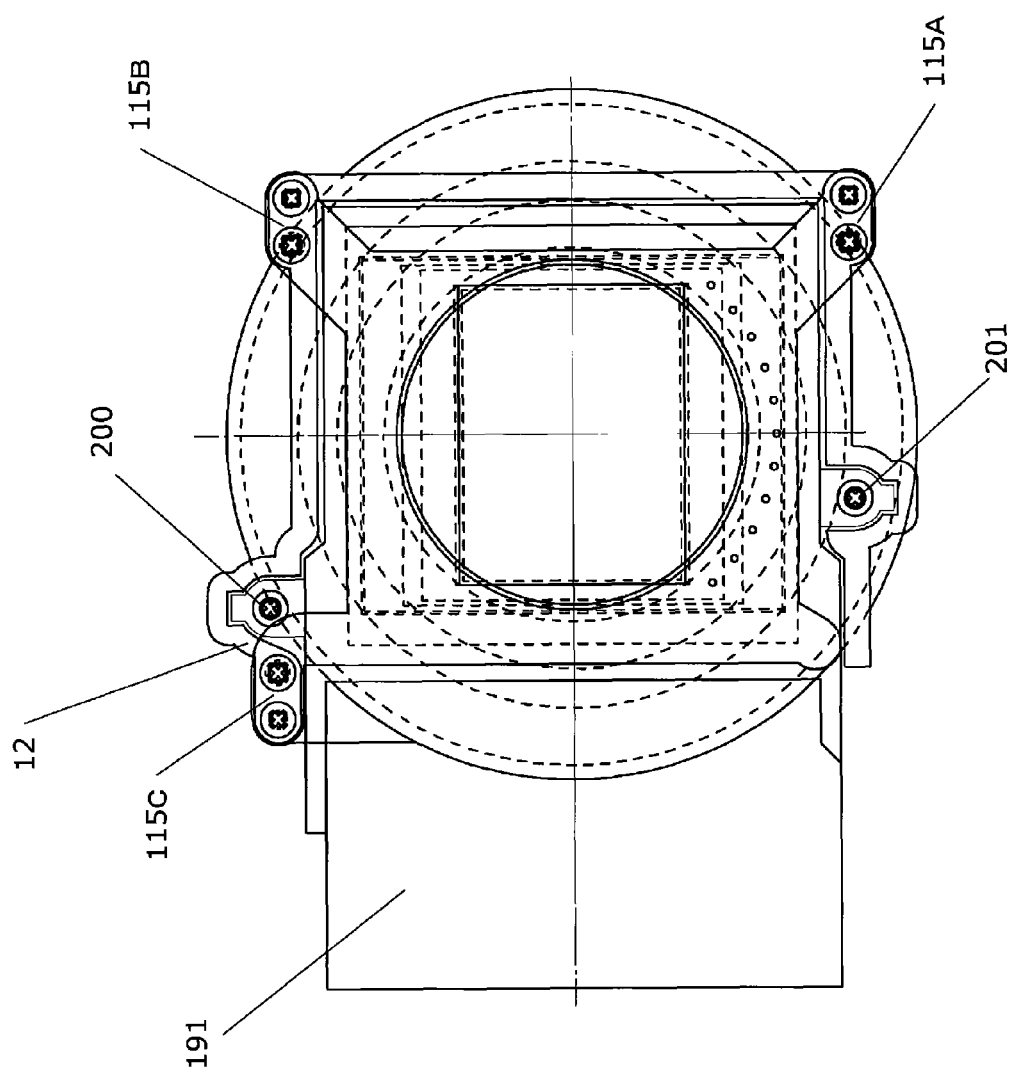
FIG. 7 is a rear see-through view of a conventional mount unit.

The configuration of a conventional camera body and that of the camera body 1 pertaining to this embodiment will now be compared. FIG. 7 is a rear see-through view of a conventional mount unit.

In the past, thread fastening was done from the rear to the chassis 12 with threaded fasteners 200 and 201 that avoided the shutter drive mechanism 191 part and the vane drive range of the focal plane shutter unit. Furthermore, the threaded fasteners 200 and 201 of the shutter unit 190 and the chassis 12 were provided at three places, namely, screw fastened components 115A, 115B, and 115C, for connecting the heat diffusing plate 115 and the chassis 12, so they had to be provided on the outside of the shutter unit 190, and this resulted in a larger planar size than with the embodiment. Also, with prior art, pulling out to the left was impossible, so the CMOS image sensor 110 that had already been adjusted for inclination had to be removed as well.

General Interpretation of Terms

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member" and "element" when used in the singular can have the dual meaning of a single part or a plurality of parts.

The term "configured" as used herein to describe a component, section, or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed.

While only selected embodiments have been chosen to illustrate the embodiment, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A camera body comprising:
   a base member;
   a body mount configured to support an interchangeable lens;
   a focal plane shutter unit; and
   a fastening member configured to fasten the focal plane shutter unit to the base member;
   the fastening member including a threaded shaft portion and a shaft head formed at a distal end of the threaded shaft portion, the shaft head configured to be manipulated when the fastening member is inserted or removed;
   wherein the body mount, the base member, and the focal plane shutter unit are disposed between the subject side of the camera body and a user side of the camera body, in that order,
   the fastening member is disposed such that the shaft head is disposed more towards a subject side of the camera body than the threaded shaft portion, and
   the focal plane shutter unit is fastened to a surface of the base member that faces toward the user side of the camera body.

2. The camera body according to claim 1, wherein
   the focal plane shutter unit includes a fastening part that overlaps the body mount as seen from the subject side of the camera body.

3. The camera body according to claim 2, wherein
the focal plane shutter unit includes shutter vanes and a mechanism for driving the shutter vanes, and
the fastening part of the focal plane shutter unit is disposed close to the mechanism for driving the shutter vanes.

4. The camera body according to claim 1, further comprising:
an imaging element unit fastened to a portion of the base member that faces the user side of the camera body so as to allow the angle of inclination of the imaging element unit and the distance of the imaging element unit from the body mount to be adjusted.

5. A camera body comprising:
a base member;
a body mount configured to support an interchangeable lens;
a focal plane shutter unit; and
a screw member having a threaded shaft portion and a screw head formed at the distal end of the threaded shaft portion, the screw member being configured to connect or disconnect the base member and the focal plane shutter unit by manipulating the shaft head,
the body mount, the base member, and the focal plane shutter unit being disposed between a subject side of the camera body and a user side of the camera body in that order, and
the screw head being disposed more towards the subject side of the camera body than the threaded shaft portion when the base member has been joined to the focal plane shutter unit.

* * * * *